(12) United States Patent
Searight et al.

(10) Patent No.: US 9,323,779 B2
(45) Date of Patent: *Apr. 26, 2016

(54) REVERSE GEOCODING SYSTEM USING COMBINED STREET SEGMENT AND POINT DATASETS

(75) Inventors: Keith R. Searight, Louisville, CO (US);
David J. Logan, Westminster, CO (US);
Freddie J. Bourland, II, Longmont, CO (US); Catherine J. Loher, Arvada, CO (US); Berkley R. Charlton, Frederick, CO (US)

(73) Assignee: Pitney Bowes Software Inc., Troy, NY (US)

( * ) Notice: Subject to any disclaimer, the term of this patent is extended or adjusted under 35 U.S.C. 154(b) by 1512 days.

This patent is subject to a terminal disclaimer.

(21) Appl. No.: 12/634,847

(22) Filed: Dec. 10, 2009

(65) Prior Publication Data

US 2010/0131196 A1 May 27, 2010

Related U.S. Application Data

(63) Continuation of application No. 11/637,364, filed on Dec. 12, 2006, now Pat. No. 7,668,651.

(51) Int. Cl.
*G01C 21/00* (2006.01)
*G06F 17/30* (2006.01)

(52) U.S. Cl.
CPC .............................. *G06F 17/30241* (2013.01)

(58) Field of Classification Search
CPC .................. G06F 17/30241; G06F 17/30595; G06F 17/3087; G01C 21/3605; G01C 21/3676; G01C 21/3679

USPC ............................................ 701/200; 382/113
See application file for complete search history.

(56) References Cited

U.S. PATENT DOCUMENTS

| 5,961,572 | A  | * | 10/1999 | Craport et al. ................ 701/207 |
| 6,282,489 | B1 | * | 8/2001  | Bellesfield et al. ........... 701/201 |
| 6,665,610 | B1 | * | 12/2003 | Correia et al. ................ 701/209 |

(Continued)

OTHER PUBLICATIONS

O'Neil, W.A., et al.: "Location Translation Within a Geographic Information System"—Transportation Research Record, Transportation Research Board, Washington, DC US, vol. 1593/1997, (1997), pp. 55-63, XP008088828.

(Continued)

*Primary Examiner* — Redhwan K Mawari
(74) *Attorney, Agent, or Firm* — Michael J. Cummings; Charles R. Malandra, Jr.; Steven Shapiro (57) ABSTRACT

A reverse geocoding system and method processes a point level dataset and a street segment dataset to determine an address for a particular latitude and longitude of an input point entered into the system. A determination is made if the point level dataset contains a point level data address match to the entered latitude and longitude data within the closest street segment and without crossing the street segment. Any such point level data address match is output. When no such point level data address match is made, the system computes an interpolated address from a range of addresses of the closest street segment in the street segment dataset based on the entered latitude and longitude of the input point in relation to said range of addresses for the closest street segment. The interpolated address from the closest street segment in the street segment dataset is output.

16 Claims, 5 Drawing Sheets

(56) References Cited

U.S. PATENT DOCUMENTS

| | | | |
|---|---|---|---|
| 7,076,505 B2 * | 7/2006 | Campbell | |
| 7,324,666 B2 * | 1/2008 | Zoken et al. | 382/113 |
| 7,376,636 B1 * | 5/2008 | Wang et al. | 707/694 |
| 2002/0188581 A1 * | 12/2002 | Fortin et al. | 706/20 |
| 2005/0171691 A1 * | 8/2005 | Smartt et al. | 701/208 |
| 2010/0131196 A1 * | 5/2010 | Searight et al. | 701/208 |

OTHER PUBLICATIONS

Papadias, D., et al.: "Query Processing in Spatial Network Databases"—Proceedings of the 29th VLDB Conference, (2003), Berlin, Germany, pp. 1-12, XP002473978.

Hoel, E.G., et al.: "Efficient Processing of Spatial Queries in Line Segment Databases"—Advances in Spatial Databases. 2nd Symposium, SSD '91 Proceedings Springier—Verlag Berlin, Germany, (1991), pp. 237-256, XP002473979.

Scarponcini, P.: "Generalized Model for Linear Referencing"—Proceeding of ACM GIS '99, (Nov. 1999), Kansas City, MO USA, pp. 53-59, XP002473980.

Annitto, R., et al.: "Modified Reverse Geocoding—a methodology for developing accurate address ranges" Proceedings of URISA '93, vol. 1, (1993), Atlanta, GA, USA, pp. 55-63, XP008088799.

Lee, n. S.T.: "Single Line Street Network: The Foundation of Mobile GIS"—Vehicle Navigation and Information Systems Conference, 1993, Proceedings of the IEEE-IEE Ottawa, Ont., Canada Oct. 12-15, 1993 New York, NY USA (Oct. 12, 1993), pp. 34-37, XP010219741.

Penninga, F., et al.: "Construction of the Planar Partition Postal Code Map Based on Cadastral Registration"—Geoinformatica Kluwer Academic Publishers Netherlands, vol. 9, No. 2, (Jun. 2005), pp. 181-204, XP002473981.

* cited by examiner

REVERSE GEOCODING SYSTEM USING COMBINED STREET SEGMENT AND POINT DATASETS

RELATED APPLICATIONS

The present application is related to U.S. application Ser. No. 11/637,364, filed Dec. 12, 2006, and assigned to the assignee of the present invention.

FIELD OF THE INVENTION

The present invention relates to reverse geocoding systems and more particularly to a reverse geocoding system employing point level and street segment datasets.

BACKGROUND OF THE INVENTION

Reverse geocoding systems return an address based on the closest georeferenced data item in a dataset to an input physical location, usually the latitude and longitude of the physical location. These datasets are generally comprised of street segment centerlines, each attributed with ranges of addresses, or single-parcel polygons that contain one street address attribute for each polygon. Individual addresses are calculated from the street segments by interpolation. Addresses are computed in parcel datasets using standard point-in-polygon processes. Street intersections are derived from street segments that abut or cross. Point or parcel datasets, hereinafter referred to as point datasets or point level datasets, are known to give more accurate results than street segment centerline datasets since they contain only the discrete addresses present on the street. However, point datasets require that a large amount of data be stored and searched to find an address for the input longitude and latitude and they do not contain intersection points.

Point datasets, consisting of parcel or improvement centroids for specific addresses are now available, but these are not comprehensive in their geographic coverage. These datasets can be combined with the street segment datasets to create a mixture of address object types. Current reverse geocoding systems find matches only to the nearest point or interpolated street segment, ignoring the sparse nature of the point data. This strict matching results in fewer high accuracy address matches being made.

Prior reverse geocoding systems include the reverse geocoding modules and custom software in Group One GeoStan systems that find the closest street segment centerline or point location to an input point and other geographic information systems including those from companies such as MapInfo Corporation and Environmental Systems Research Institute (ESRI). These systems find the closest street object to an input point in order to find approximate addresses. Interpolation techniques may also be employed to create the estimated address for an input point.

The sources of data for centerline and point level address matching have historically come from postal services and from digital map vendors, including census bureaus. The centerline datasets for address matching are largely complete due to their maturity and because they contain ranges of addresses rather than individual addresses. Newer point level datasets contain only one address per record and, as noted above, may not contain all addresses and lack intersections.

SUMMARY OF THE INVENTION

It is an object of the present invention to provide a system that combines centerline and point level datasets for reverse geocoding purposes. It is a further object of the present invention to provide a reverse geocoding system that combines centerline and point level data to find the nearest and most accurate address to a particular location for the available data.

It is yet another object of the present invention to match to the most accurate nearby address or intersection based on analyzing the geometric relationships of the combined street networks and individual locations in datasets containing both street segment and point data.

It is also an object of the present invention to employ the spatial relationships of street segment networks and point locations and select matches to slightly farther points over interpolated street segment locations to increase the overall system accuracy in providing an address for physical locations.

In a reverse geocoding system, a method for processing a point level dataset containing point level data addresses and a street segment dataset containing street segment data with ranges of addresses for street segments to determine an address for a particular location embodying the present invention includes the steps of entering the latitude and longitude of an input point into the system and determining if a point level dataset contains a point level data address match to the entered latitude and longitude data within the closest street segment and without crossing the closest street segment. Any such point level data address match of the entered latitude and longitude of the input point within the closest street segment and without crossing the closest street segment is output. When no such point level data address match is made, the system computes an interpolated address from the range of addresses of the closest street segment in a street segment dataset based on the entered latitude and longitude of the input point in relation to the range of addresses for the closest street segment. The interpolated address from the closest street segment in the street segment dataset is output.

In accordance with a feature of the present invention the street segment dataset further contains unranged street segments without ranges of addresses and the said output address can be an actual address, an intersection and an unranged street segment.

A reverse geocoding system embodying the present invention includes a processing system with a point level database coupled to the processing system, the point level database having point level data. A segment database is coupled to the processing system. The segment database has street segment data with a range of addresses for street segments. An input system is coupled to the processing system for entering the latitude and longitude of an input point into the processor and an output system is coupled to the processor for outputting processed data to provide address information. A program store in the processor is operable for a latitude and longitude of an input point entered into the processor to cause the processor to determine the point level database contains a point level data address match to the entered input point within the closest street segment and without crossing the closest street segment and outputting any point level data address match of the entered latitude and longitude of the input point within the closest street segment and without crossing the street segment, and to compute an interpolated address from the range of addresses of the closest street segment in the street segment database based on the entered latitude and longitude of the input point in relation to the range of addresses for the closest street segment when no point level data address match is made and outputting one or more addresses for the latitude and longitude of an input point.

BRIEF DESCRIPTION OF THE DRAWINGS

Reference is now made to the various figures wherein like reference numerals designate similar items in the various views and in which.

DETAILED DESCRIPTION OF THE PREFERRED EMBODIMENT

Figure 1:
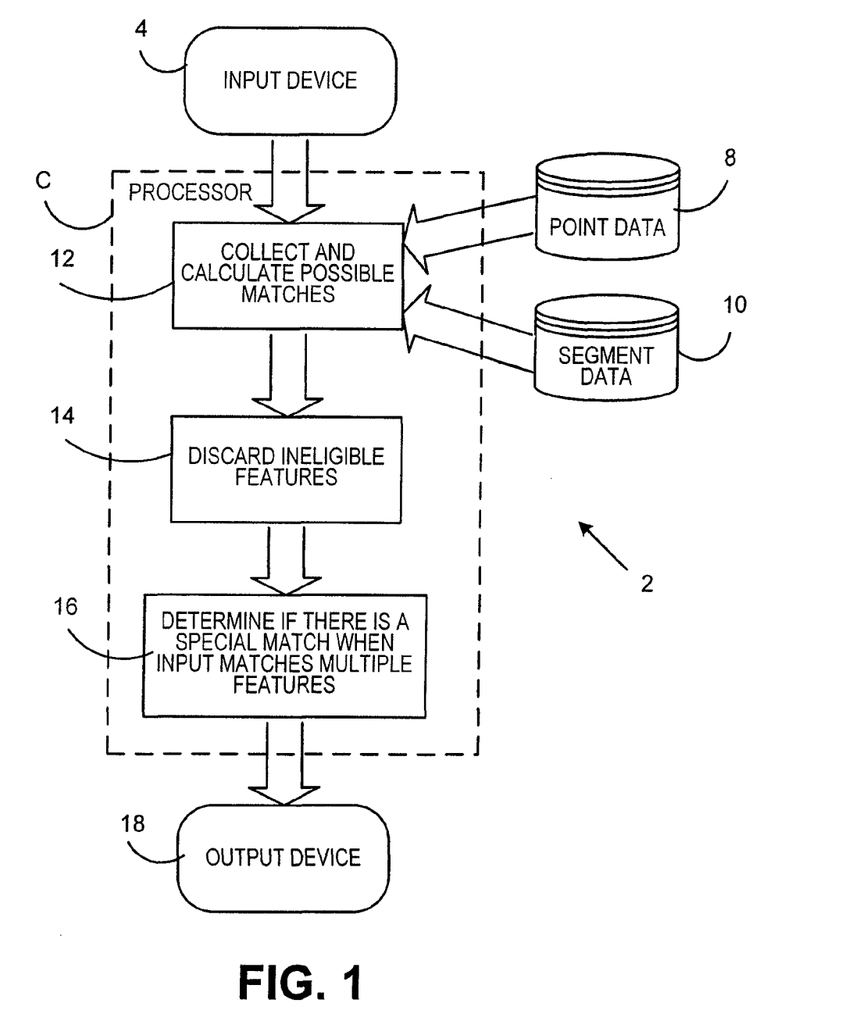
FIG. 1 is a block diagram of a reverse geocoding system using combined street segments and point level datasets embodying the present invention.

Reference is now made to FIG. 1. A reverse geocoding system 2 includes an input device 4. The input device 4 can be, for example, a keyboard or other input system. The input can also be from another module in a larger system that requires information from the reverse geocoding system 2. The input device 4 is connected to a processor 6. The processor 6 is connected to operate in conjunction with a database 8 containing point data and a database 10 containing street segment data. The processor 6 contains a program store which causes the processor 6 to process information from both the database 8 and the database 10 and operate in the manner shown in FIG. 2. This is based on input data from the input device 4 of the latitude and longitude of an input point to be processed, along with a maximum search distance in all directions to be used to find a specific feature through the reverse geocoding system 2 and a squeeze distance. The squeeze distance is an offset from the ends of each street segment where addresses or house numbers begin or end. It recognizes the area occupied by intersection and is user entered.

Point data in database 8 are datasets where a single latitude and longitude is provided for a specific address. Segment data in database 10 are datasets where a street segment line often as a street centerline is provided and interpolation is employed to relate the street centerline to a specific address for the address. Parity rules such as odd and even addresses lying on different sides of the street segment can also be employed.

The street segment centerline dataset in database 10 contains coordinates that describe the shape of each street and usually the range of house numbers found on each side of the street. The reverse geocoding system 2 may compute an address for a physical location by first calculating where a physical location exists with respect to the street address range. The reverse geocoding system then applies this calculated percentage to the street segment centerline coordinates, offsets, squeeze distance and parity rules to interpolate an address for a physical location. The point level datasets in database 8 result in higher quality addresses accuracy than those requiring the interpolation technique. However, as previously noted, these point level datasets often do not contain every address and are therefore incomplete.

The segment data in database 10 is a group of street segments. Each street segment contains a group of latitudes and longitudes (i.e., a group of ordered points), and there is assumed to be a sub-street segment of the street in a straight line between the two points at the end of each street segment. A street segment must have at least two points, but can have many points. Most street segments contain a house number range (an address range) and reverse geocoding to a street segment works by reverse-interpolating the house number based on the house number range.

The point data in database 8 is a group of point data locations, which are, essentially, latitudes and longitudes of the rooftops of addresses. This data allows precise pinpointing of an address to an exact location, whereas the street segment data above requires interpolation. This is not necessary for a point data match. There is usually only one house number associated with a point in the point data. When there are multiple house numbers, it means the point is a feature such as a high rise building, in which case a convention may be implemented such as returning as a match the lowest available unit.

When calculating a house number (address) from a street segment, several other matters come into play. First, street segment records contain direction information, and the house number range data contains parity information. Direction indicates whether the house number ranges increase or decrease while traversing the set of ordered points. Parity indicates whether odd numbered houses are on the left side, the right side, or can not be determined. It is known if there is a house number range on the side of the street the input point is on. If there are no addresses on the side of the street the input point is on, the street segment is considered unranged for purposes of feature selection.

Where, for example, United States Postal Service (USPS) data is used, information is provided whether it can be determined which the side of the street the input point is on. If it is known that odds are on one side and evens are on the other, then a two house per street segment methodology is used. Otherwise, a one house per street segment methodology is used. Where it is known that odd addresses are on one side of a street segment and even addresses are on the other side of a street segment, the street segment is split up by the equation: (high house number minus low house number) divided by two. Where the odd and even addresses are not known to be on opposite sides of a street segment, the line street segment is split up by the equation: high house number minus low house number. In the second case, it is not possible to reliably select a house number whose parity (even or odd) matches the physical reality. In the first case, the interpolation may be off by a house number or two, but the parity will be correct.

The processor 6 processes point data from database 8 and street segment data from database 10 by collecting and calculating possible matches, based on the input at the input device 4 at block 12. At block 14, processor 6 discards ineligible features from the collected and possible matched data. At block 16, the processor 6 determines if there is a special match when the input data matches multiple features. Finally, the processor 6 outputs the processed information to an output device 18. The output device 18 may be a monitor, a printer or another output device or an input to another module in a larger system. The desired output is information about the closest physical feature to the input point. The output may include an actual address, an intersection (two or more streets that abut or cross) and/or an unranged street segment, that is, a street segment with no address numbers, such as an on-ramp or freeway.

The reverse geocoding system 2 takes input data for a point at input device 4 and provides at output device 18 an information output of an accurate nearby address or feature. The reverse geocoding system 2 combines street segment data with point street segment data in a manner to achieve more accurate addresses for the reverse geocoding system 2. The street segment data has wide coverage, but requires interpolating latitudes and longitudes using range data in order to determine an address. The point address data is incomplete, but has exact latitudes and longitudes for specific addresses. By analyzing the spatial relations of the street segment networks and the point locations and selecting matches to slightly farther points over interpolated street segments when street side street segment and parity rules are met, a greater accuracy in processing the information is achieved in a higher percentage of the points processed by the reverse geocoding system 2. When the conditions are not met, the nearest interpolated street segment address is matched. If a single point data address is not the final candidate in processing the data from the point database 8 and the street segment database 10, various levels of cascading processing are employed to eliminate duplicates and/or provide the most accurate interpolated address or intersections available.

Figure 2:
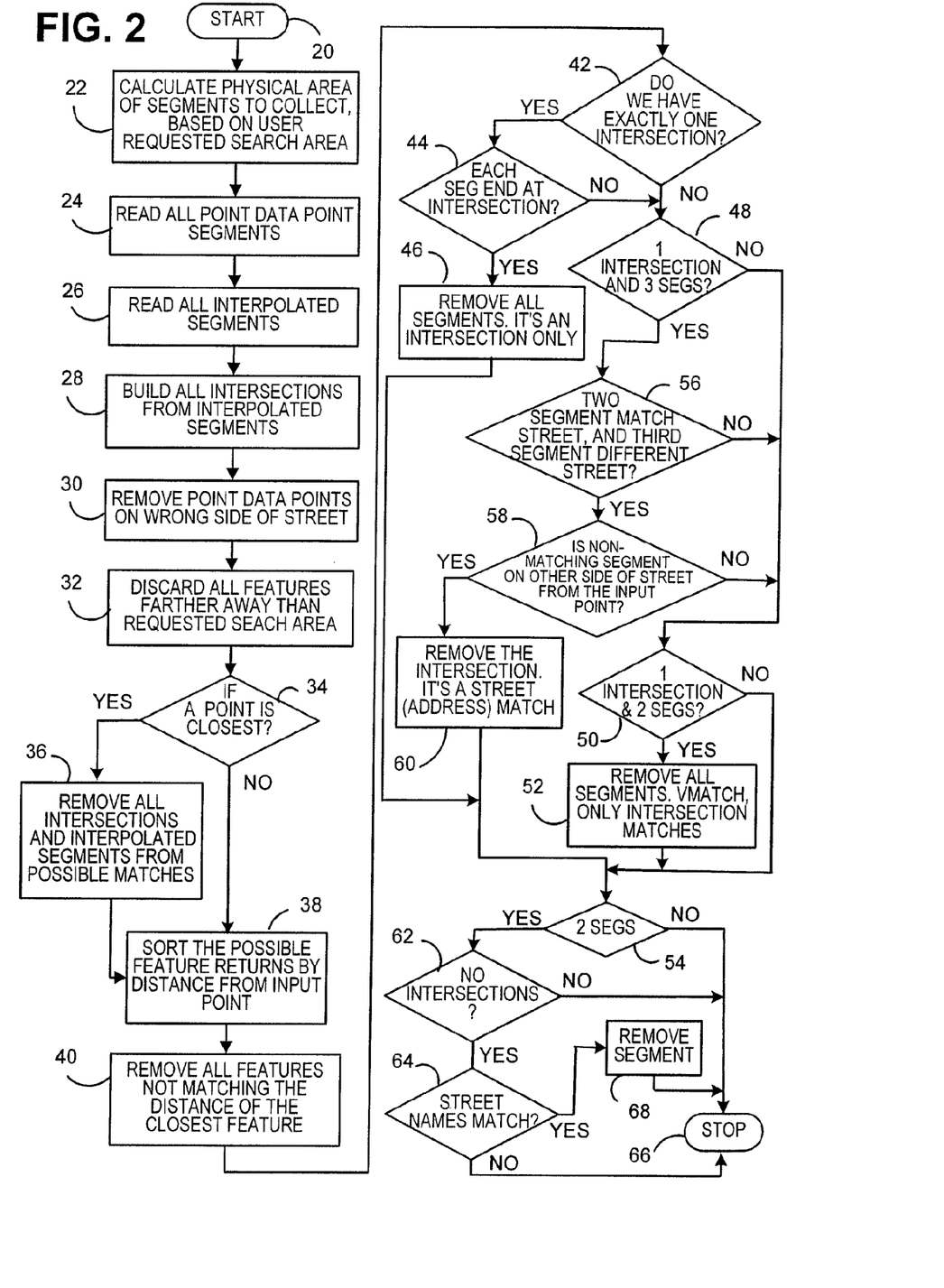
FIG. 2 is a flow chart of the operation of the system shown in FIG. 1.

The reverse geocoding system 2 operates as shown in the flow chart in FIG. 2 to generate more accurate matches to addresses by preferring some point addresses over slightly closer interpolated street segment addresses. This results in a higher number of address matches to the most accurate data while excluding incorrect matches, such as to a point located on the wrong side of the street. When an interpolation and/or intersection is inevitable, operation of the system will eliminate incorrect matches for certain special situations.

The street segment data in database 10 is a group of street segments. Each street segment contains a group of latitudes and longitudes, i.e., a group of ordered points, and there is assumed to be a sub-street segment of the street in a straight line between the two points. A street segment must have at least two points but can have many points. A street segment may contain a house number range. Reverse geocoding to a street segment works by reverse-interpolating the house number. The point data in database 8 is a group of point data locations, which are essentially latitudes and longitudes of the rooftops of addresses. This allows a precise pinpointing of an address to an exact location, whereas the street segment data in database 10 requires interpolation. This is not necessary for a point data match. There is usually only one house number associated with a point in the point data. When there are multiple house numbers, it generally means that the point is a high-rise building, in which case a convention can be elected, such as identifying the lowest available unit number.

Reference is now made to FIG. 2. The process starts at block 20 where the input point data is entered. At block 22, based on a user-requested search area, the physical area of street segments collected is calculated. At block 24, all the point data point street segments are read. At block 26, all of the interpolated street segments are read. The intersections from all the interpolated street segments are built at block 28.

Intersections are created by comparing the end points of all street segments to the end points of all other street segments. If the end points match, there are either: (a) two street segments of the same street or (b) an intersection of two streets. In the latter case, the intersection is added to the list of possible intersections. The point data on the wrong side of a street is removed at block 30. Thus, point data is discarded based on the street segment side. If there are returnable point data points, they must be on the same side of the street as the input point. It is still unknown to what street segment(s) the input point may match. Working through every street segment, then through every sub-street segment of street segment line data, it is mathematically calculated as to which side of the street segment line the input point is on, and to which side of the street segment line the point data point is on. If they do not match, the point is discarded from consideration. Although the input point and the point data point may be on differing sides of the street segment line, if a straight line from point data point to input point does not cross that street's sub-street segment, then the point is not discarded This provides improved processing. There must be an actual street segment physically between the two points (input point and point data address) in order for a point data point to be discarded. Simple algebra is used to determine if a straight line between the point data point (address match) and the input point cross the street segment line under consideration. At block 32, all of the features farther away than the requested search area are discarded.

Once the system has collected street segments and point data locations, built intersections, and discarded point data features that cannot possibly be on the same side of any street as the input point, all but the closest features may be discarded. At decision block 34, a determination is made if a point is closest. If a point match is closest, at block 36 all intersections and interpolated street segments from possible matches are removed.

At block 38, the possible features returned by distance from input points are sorted. Using the distance between the input point and the closest feature, all features that are farther away than that distance, plus a margin of error, are discarded at block 40. At this point, there are normally either zero features, or one feature, which can now be selected and further processed; however, if there are multiple features left, then it is necessary to determine if all the features will be selected as a multi-match or some of these features may be removed using cascading logic that scans for specific geometric relationships between the matched street segments. At decision block 34, if no point match is the closest, block 36 is bypassed and the process continues at block 38 in the manner previously described.

At decision block 42, a determination is made if there is exactly one intersection match. If this is the case, the process continues at decision block 44 and a determination is made whether each street segment ends at the intersection. If this is the case, at block 46 all of the street segments are removed, indicating that there is an intersection only. Matching to all street segments and the intersection implies that the input point matches to all of the segment endpoints. This means that the point matches to the intersection, so that all segments may be removed, leaving only the intersection as the matched feature. However, at decision block 44, if each street segment does not end at the intersection, processing continues at decision block 48 where a determination is made if the intersection includes three street segments. If the intersection does not include three street segments, a determination is made at decision block 50 whether the intersection includes two street segments. If the intersection does include two street segments, this is a "V" match where all segments are removed and only intersection matches. It is called a "V" match because the input point can be within the "V", or outside of the "V", when considering the endpoint joining both segments. If the input point is within the "V", it returns a multi-match or an intersection match if both street segments have different street names. If the input point lies outside of the "V", then it returns either an intersection match when the street segments have different names, or a single address match when the street segments match. The angle of the joined segments with reference to the input point is a key discriminant. There can never be a multimatch if the two segments extend away from the input point with respect to the point joining both street segments. Processing continues at decision block 54. Where, however, at decision block 50 a determination is made that it is not one intersection and two street segments, processing directly proceeds to decision block 54.

Where at decision block 48 it is determined that one intersection and three street segments are present, processing continues at decision block 56 and a determination is made if the two street segments match the street and the third street segment matches a different street. If this is not the case, processing continues as previously described at decision block 50. If this is the case, however, processing continues at decision block 58 and a determination is made if the non-matching street segment is on the other side of the street from the input point. If the non-matching street segment is on the other side of the street from the input point, at decision block 60 the intersection is removed. It is a street (address) match. Processing continues at decision block 54.

At decision block 54, a determination is made if there are two street segments. If there are two street segments, a determination is made at decision block 62 as to whether or not there are any intersections. If there are no intersections, a determination is made at decision block 64 as to whether or not the street names match. If the street names do not match, the process stops at block 66. Where the determination is made that there are not two street segments at decision block 54, or there is no intersection at decision block 62, the process in both cases continues to stop at block 66 with an output of the information to output device 18. However, at decision block 64, if the street names do match, at decision block 68 one of the street segments is removed and the process continues to block 66 to output the information to output device 18.

The reverse geocoding system 2 thus operates to match addresses more accurately, in part, due to the specific functions described above. The reverse geocoding system 2 increases accuracy by combining point data records and street segment data records, and examines both sets of data in tandem. The reverse geocoding system 2 also increases the accuracy of selecting a point data point, when one (or more) are eligible by employment of "side of street" processing. And further, the reverse geocoding system 2 increases accuracy by employing a methodology to determine the best match that handles various special case situations, and to determine whether to return intersections or interpolated addresses when the answer can be unclear due to particular street segment network geometries.

The reverse geocoding system 2 thus operates to analyze the spatial relationships of the street segment network and the point locations and selects matches to slightly further points over interpolated street segments when strict street side rules are met. When these conditions are not met, the nearest interpolated street segment address is matched. Lastly, if a point data point is not the final candidate, various levels of cascading processing is employed to eliminate duplicates and/or provide the most accurate interpolated address or intersection available.

The reverse geocoding system 2 as described above operates to generate more accurate matches to addresses by preferring some point addresses over slightly closer interpolated street segment addresses in certain situations. This results in a higher number of address matches to the most accurate data while excluding incorrect matches, such as to a point located on the wrong side of the street. When an interpolation and/or intersection is inevitable, the reverse geocoding system 2 operates to help ensure that all of the special cases eliminate incorrect returns.

Thus with an input of a latitude and longitude, a maximum search distance in all directions used to find a feature, and, the squeeze distance; the reverse geocoding system 2 operates to utilize the available point data and segment data to provide an output of the closest physical feature to the input point such as: an actual address, an intersection (two or more streets that abut or cross), or, an unranged street segment, that is, a street segment with no addresses, such as an on-ramp of a freeway.

Figure 3:
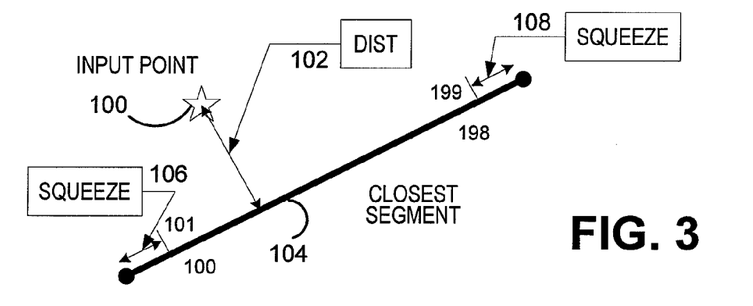
FIG. 3 is a schematic diagram helpful in understanding the operation of the reverse geocoding system shown in FIG. 1, illustrating a single center line street segment for an input point where no point data is available for the relevant street segment.

Reference is now made to FIG. 3. With an input point 100, the direct distance 102 to the closest street segment 104 is determined. Whenever, here and elsewhere, the reverse geocoding system 2 needs to locate the closest street segment, such data is obtained from the street segment database 10. Taking into account the squeeze distance 106 and 108 at the end of the street segment, the house number is determined by interpolating between the ends of the street segments to obtain a house number 129.

Figure 4:
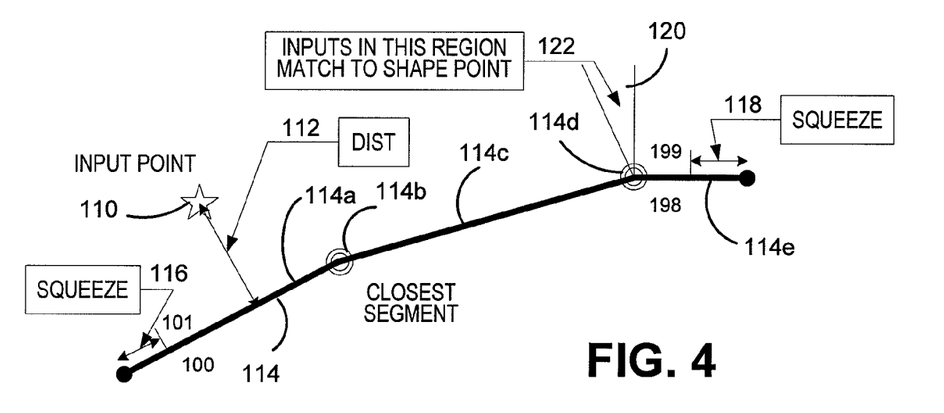
FIG. 4 is a schematic diagram helpful in understanding the operation of the reverse geocoding system shown in FIG. 1, illustrating three center line street segments for an input point and also illustrating an irregular input region at an intersection of two center line street segments where no point data is available for the relevant street segment.

Reference is now made to FIG. 4. An input point 110 is used to determine the closest direct distance 112 to the closest street segment 114. Taking into account the squeeze distance 116 at one end of the street segment and the squeeze distance 118 at the other end of the street segment, the interpolation determines that the house number is 111. In the present case, the street segment includes three sub-street segments. The street segment 114 includes a sub-street segment 114*a* joined at an intersection point 114*b* to a second sub-street segment 114*c* and by an intersection point 114*d* to a third sub-street segment 114*e*. If an input point were in the region denoted by 120, such as an input point at 122, the point would map to the shape point 114*d*.

Figure 5:
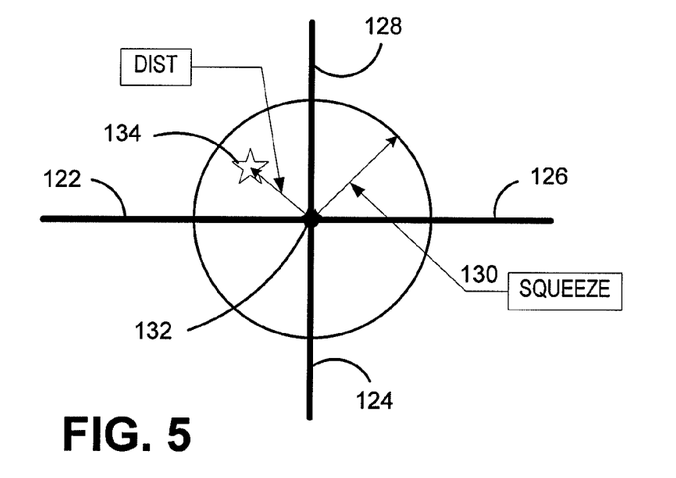
FIG. 5 is a schematic diagram helpful in understanding the operation of the reverse geocoding system shown in FIG. 1, illustrating four center line street segments intersecting and with a single input point within the squeeze distance for the intersecting center line street segments where no point data is available for the relevant street segment.

Reference is now made to FIG. 5. The four street segments 122, 124, 126 and 128 form an intersection. The squeeze distance 130 is a circular area around and centered on the intersecting point 132. Any input point within the squeeze distance 130, such as point 134, lies within the interior of the circle map and returns a match to the intersection 132 instead of an address.

Figure 6:
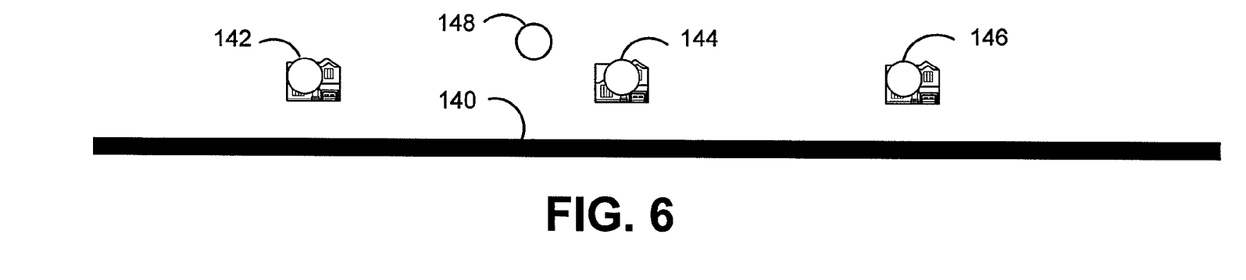
FIG. 6 is a schematic diagram helpful in understanding the operation of the reverse geocoding system shown in FIG. 1, illustrating a single street segment for an input point where both point data and center line data are available.

Reference is now made to FIG. 6. A street segment 140 has three point data points 142, 144 and 146 on one side of the street segment 140. An input point of 148 on the same side of the street as all of the addresses or points, will match to the nearest point. No interpolation will ever be done. In this example, the input point matches to the address of house 144.

Figure 7:
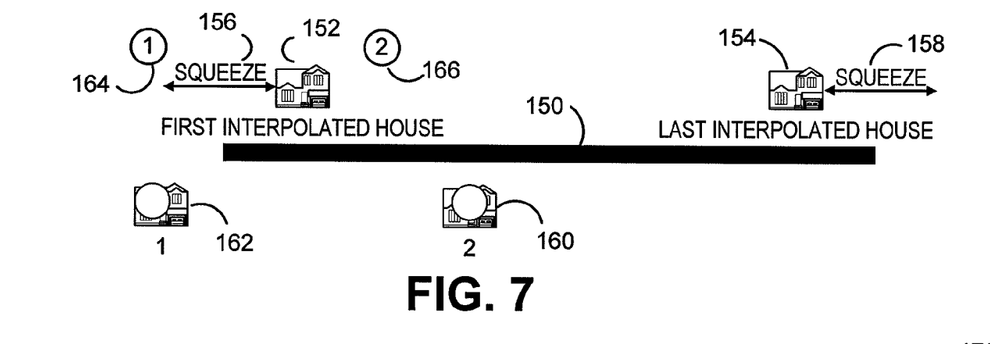
FIG. 7 is a schematic diagram helpful in understanding the operation of the reverse geocoding system shown in FIG. 1, illustrating a single street segment for two different input points and with houses on opposite sides of a street where both center line and point data are available.

Reference is now made to FIG. 7. Two input points are shown: 164 and 166. Two point data points are shown: 160 and 162. Considering input point 164, the reverse geocoding system will first look at both point data points, 162 and 162. Point data point 162 is not across the street from input point 164, because no street segment physically separates them. Therefore, point data point 162 is returned as the sole match to input point 164. However, point data point 160 would be physically across the street from input point 164 and would not be a possible match. Now reviewing input point 166, and considering both point data points 160 and 162, in both cases a street segment separates the input point 166 from the point data points 160 and 162. Therefore, both point data points are discarded as possible matches. All that is left now is to reverse interpolate an address from the street segment using the range data and the input squeeze value.

Figure 8:
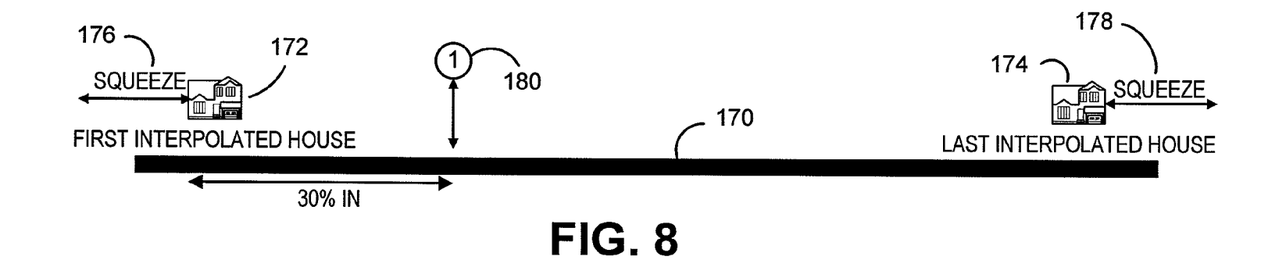
FIG. 8 is a schematic diagram helpful in understanding the operation of the reverse geocoding system shown in FIG. 1, illustrating, similar to FIG. 3, a single street segment where center line data is available.

Reference is now made to FIG. 8. For input point 180, when calculating interpolated house numbers from street segments, the ranges of addresses are split up evenly across the street segment and a house number is calculated, depending on how far in the input point is from the beginning of the street segment after the squeeze distances 176 and 178. If the range of the street segment shown in FIG. 8 were 100-199, with 100 being the house number at address 172 and 199 being the house number at address 174, the interpolated house number would be 115. The calculation is: 100+[(199−100)/2]× 0.3=115. If the street name were Main Street, the interpolated address would be 115 Main Street. This calculation includes a division by two, since it is assumed that there are houses directly opposite each other on both sides of the street. This is because of a parity of "BOTH" is used (as contrasted with even or odd parity), where houses are on both sides of the street segment, with even houses or addresses on one side of the street and odd houses or addresses on the other side of the street. If the street parity were unknown, there would be no division by two. In that case, the house range is divided along the centerline, rather than assuming there are two houses per centerline area (odds on one side, evens on the other.) The calculation includes a multiplication by 0.3 because the input point 180 is 30% from the end of the street segment after the squeeze distance 176.

Figure 9:
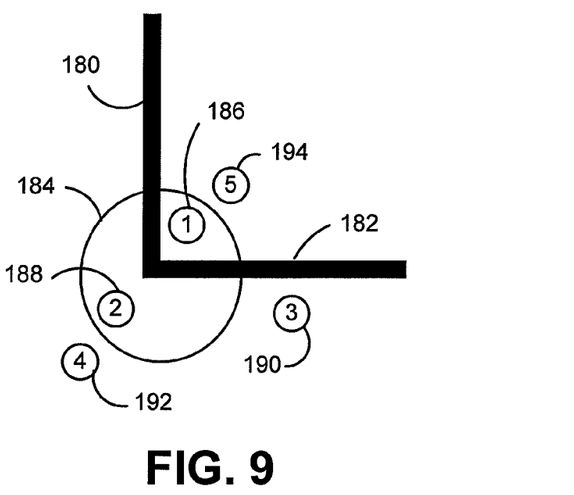
FIG. 9 is a schematic diagram helpful in understanding the operation of the reverse geocoding system shown in FIG. 1, illustrating an "V" shaped intersection of two street segments (in this case, at right angles) with five different input points, two input points within the intersecting squeeze area and three input points outside of the intersection squeeze area.

Reference is now made to FIG. 9. An intersection is formed by street segments 180 and 182. At the apex of the intersection, a squeeze area is defined by the circular area 184. If intersection matches are desired, the user-defined squeeze value comes into play. Any input point that is within the squeeze value of the two street segments will return an intersection match. If intersections are not desired, input points 186 and 188 would return a multi-match to two addresses, one on street segment 180 and the other on street segment 182. With intersection matching, both input points 186 and 188, however, return a single match to the intersection. The input point 190 always returns an address match, because it is outside the user-supplied squeeze value 184.

Input point 192 illustrates a special case, which is described as a "V" match. A "V" match is a match to both a segment and an intersection, exactly the same situation as input point 194. However, unlike input point 194, input point 192 matches to the endpoints of both segments, indicating that it is on the "outside" of the V. This means that regardless of how far away the input point is from the intersection, it will still return an intersection match. Input point 192 lies outside of the squeeze distance 184. By default, this would return a multi-match to both street segments 180 and 182. However, input point 192 will return intersection match, because the input point matches only to the end points of both street line segments (i.e., both street line segments travel away from the input point). Thus, even though the input point 192 falls outside the squeeze value, it still returns a single intersection match. Input point 194 is the same distance away from the intersection as input point 192, but, in this case, input point 194 returns a multi-match, since input point 194 is equidistant from both street segments 180 and 182, and if it was also equidistant from the intersection, the intersection would be returned as an additional output match as well.

Figure 10:
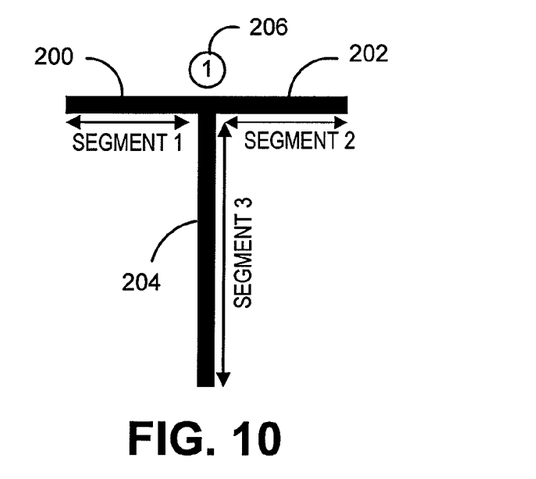
FIG. 10 is a schematic diagram helpful in understanding the operation of the reverse geocoding system shown in FIG. 1, illustrating a "T" shaped intersection of two street segments and a single input point wherein both point data and center line data are available; and, FIG. 11 is a schematic diagram helpful in understanding the operation of the reverse geocoding system shown in FIG. 1, illustrating a single street segment composed of two street segments and a single input point wherein point data and center line data are available.

Reference is now made to FIG. 10. Three street segments 200, 202, and 104 form a single "T" shaped intersection. Additionally, street segment 200 and 202 are actually the same street, so defined because they have exactly the same street name. If the user-defined squeeze distance were used in this case, it would return an intersection match. However, squeeze distances are not employed in this situation. This is because, in reality it is most likely that the north side of the street (above the T) will have houses numbered without any break at the intersection. Accordingly, the reverse geocoding system 2 must determine if this condition is present, and return an interpolated house number back for the street if it is on the north side of the street (the far side from street segment 204). Any input point on the south side of the street (same side as street segment 204) is subject to the normal intersection and interpolation processing. Thus, input point 106, even though it is within said squeeze distance but at the remote side of said intersecting segments, being on the north side of the street, is processed based on an interpolated house number for the street, consisting of street segments 200 and 202. The segments 200 and 202 do not have to lie in a straight line, since a "Y" relationship employs the same processing logic. Thus, a single "Y" shaped intersection is treated the same as and is considered to be a "T" shaped intersection.

Figure 11:
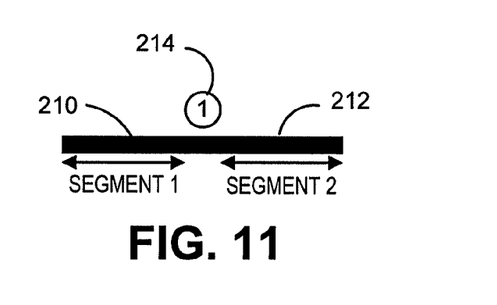

Reference is now made to FIG. 11. A street is made up of a street segment 210 and a street segment 212. It is similar to FIG. 10, except for the absence of a third street segment (like street segment 204). Because there are two street segments for input point 214, the system would normally return a multi-match. However, since both these street segments have the same street name, the reverse geocoding system chooses one street segment and discards the other street segment. Thereafter, an interpolated address is determined. This causes an address match to be returned, rather than a two-street segment multi-match.

The term "data" as used herein is a broad term. It encompasses both partial and complete input location data and longitude and latitude inputs in decimal degrees. Also, address data is intended to include specific addresses such as a house address or a feature such as an onramp for a freeway or a highway. Additionally, street segment or street segment centerline datasets need not necessarily be in the center of the street.

While the present invention has been described in connection with what is presently considered to be the most practical and preferred embodiments, it is to be understood that the invention is not limited to the disclosed embodiment, but, on the contrary, is intended to cover various modifications and equivalent arrangements included within the spirit and scope of the appended claims.

What is claimed is:

1. In a reverse geocoding system, a method for processing a street segment dataset containing street segment data with ranges of addresses for street segments to determine an address for a particular location comprising the steps of:
receiving a latitude and longitude of an input point into said system;
computing an interpolated address from the range of addresses of a closest street segment in a street segment dataset based on said entered latitude and longitude of said input point;
receiving in said system a squeeze distance and wherein said interpolated address is calculated from a range of addresses for said closest street segment excluding the squeeze distance at each end the end of said closest street segment; and
outputting said interpolated address from said closest street segment in said street segment dataset.

2. In a reverse geocoding system, a method for processing a street segment dataset containing street segment data with ranges of addresses for street segments to determine an address for a particular location as defined in claim 1, wherein said street segment dataset further unranged street segments without ranges of addresses.

3. In a reverse geocoding system, a method for processing a street segment dataset containing street segment data with ranges of addresses for street segments to determine an address for a particular location as defined in claim 2, wherein said output address can be an actual address, an intersection of street segments and an unranged street segment.

4. In a reverse geocoding system, a method for processing a street segment dataset containing street segment data with ranges of addresses for street segments to determine an address for a particular location as defined in claim 1, further comprising the steps of: entering into said system a maximum search distance in all directions used to find a an address for said input point and limiting the data from said street segment database to be within said maximum search distance from said input point.

5. In a reverse geocoding system, a method for processing a street segment dataset containing street segment data with ranges of addresses for street segments to determine an address for a particular location as defined in claim 1, further comprising the steps of: determining if said input point is within said squeeze distance of two intersecting street segments and outputting said intersection of said street segments as said address for said input point when said input point is within said squeeze distance.

6. In a reverse geocoding system, a method for processing a street segment dataset containing street segment data with ranges of addresses for street segments to determine an address for a particular location as defined in claim 1, further comprising the steps of: determining if said input point is within said squeeze distance of three intersecting street segments forming a T shaped intersection and outputting said intersection of said street segments as said address for said input point when said input point is within said squeeze distance except for those input points that are within said squeeze distance but at the remote side of said intersecting segments.

7. In a reverse geocoding system, a method for processing a street segment dataset containing street segment data with ranges of addresses for street segments to determine an address for a particular location as defined in claim 6, further comprising the steps of: outputting an interpolated address for said input points that are within said squeeze distance but at the remote side of said T shaped intersecting segments.

8. In a reverse geocoding system, a method for processing a street segment dataset containing street segment data with ranges of addresses for street segments to determine an address for a particular location as defined in claim 1, further comprising the steps of: determining if said input point is within said squeeze distance of two intersecting street segments forming a V shaped intersection and outputting said intersection of said two intersecting street segments as said address for said input point when said input point is within said squeeze distance.

9. In a reverse geocoding system, a method for processing a street segment dataset containing street segment data with ranges of addresses for street segments to determine an address for a particular location as defined in claim 8, further comprising the steps of: determining if said input point is outside of said squeeze distance of two intersecting street segments forming a V shaped intersection and outputting said intersection of said two intersecting street segments as said address for said input point when said input point is outside of said squeeze distance and matches only the end points of each of said intersecting street segments such that each of said intersecting street segments lie in a direction that travel away from said input point.

10. In a reverse geocoding system, a method for processing a street segment dataset containing street segment data with ranges of addresses for street segments to determine an address for a particular location as defined in claim 9, further comprising the steps of: determining if said input point is outside of said squeeze distance of two intersecting street segments forming a V shaped intersection and outputting a multi-match to each of said two street segments as said address for said input point when said input point is outside of said squeeze distance and is equidistant from each of said two street segments.

11. In a reverse geocoding system, a method for processing a street segment dataset containing street segment data with ranges of addresses for street segments to determine an address for a particular location as defined in claim 10, further comprising the steps of: outputting said intersection of said two intersecting street segments as an additional match of said multi-match when said input point is additionally equidistant from said intersection of said two intersecting street segments.

12. In a reverse geocoding system, a method for processing a street segment dataset containing street segment data with ranges of addresses for street segments to determine an address for a particular location as defined in claim 11, further comprising the steps of: determining if said input point is within said squeeze distance of three intersecting street segments forming a T shaped intersection and outputting said intersection of said street segments as said address for said input point when said input point is within said squeeze distance except for those input points that are within said squeeze distance but at the remote side of said intersecting segments.

13. In a reverse geocoding system, a method for processing a street segment dataset containing street segment data with ranges of addresses for street segments to determine an address for a particular location as defined in claim 12, further comprising the steps of: outputting an interpolated address for said input points that are within said squeeze distance but at the remote side of said T shaped intersecting segments.

14. In a reverse geocoding system, a method for processing a street segment dataset containing street segment data with ranges of addresses for street segments to determine an address for a particular location as defined in claim 13, further comprising the steps of: entering into said system a maximum search distance in all directions used to find a an address for said input point and limiting the data from said street segment database to be within said maximum search distance from said input point.

15. In a reverse geocoding system, a method for processing and a street segment dataset containing street segment data with ranges of addresses for street segments to determine an address for a particular location as defined in claim 14, wherein said street segment dataset further contains unranged street segments without ranges of addresses.

16. In a reverse geocoding system, a method for processing a street segment dataset containing street segment data with ranges of addresses for street segments to determine an address for a particular location as defined in claim 15, wherein said output address can be an actual address, an intersection and an unranged street segment.

\* \* \* \* \*